United States Patent Office 3,257,731
Patented June 28, 1966

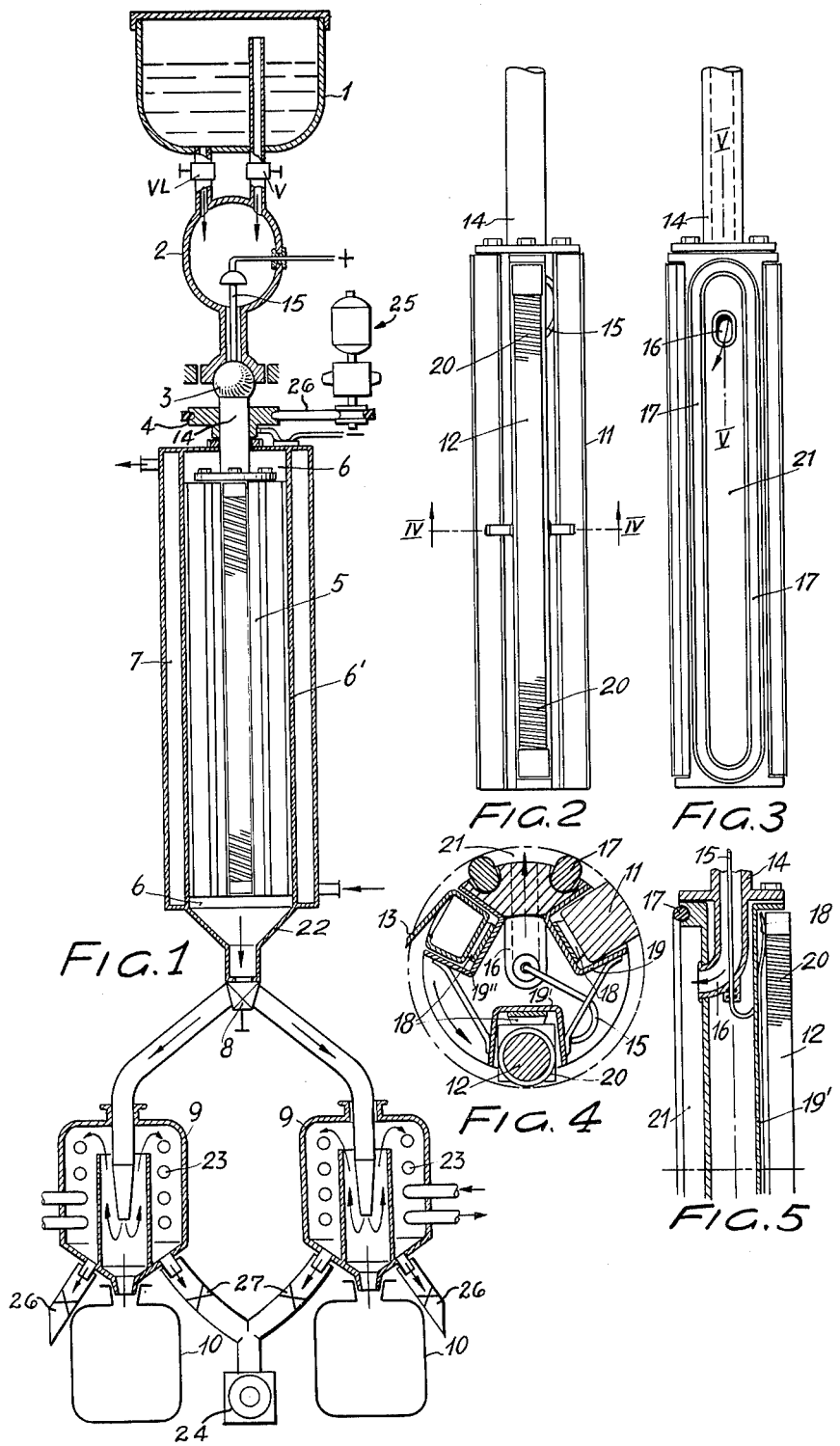

3,257,731
PROCESS AND EQUIPMENT FOR THE CONTINUOUS LYOPHILIZATION OF LIQUID SUBSTANCES
Giuseppe Vigano, Via Ponchielli 8, Milan, Italy
Filed May 29, 1963, Ser. No. 284,787
5 Claims. (Cl. 34—5)

The present invention relates to a new process and apparatus for effecting the lyophilization of liquid substances, that is, the dehydrating after prior freezing of thermo-labile or thermo-sensitive substances.

Various apparatuses for obtaining the lyophilization of foodstuffs are already known and consist essentially of a battery of superposed planes, on each of which there is spread in a frozen state the substance to be lyophilized, where, however, dehydration requires a notably substantial expenditure of time and the very large surfaces required necessitates an inconveniently large space for the apparatus. In these known apparatuses it is very difficult to attain sufficient heat transfer to the frozen product without bringing about its melting. As a result, of the last mentioned problem, the dehydration takes about 12 hours, though very large surfaces with the already mentioned are used.

It is an object of the present invention to provide a new process and a new apparatus whereby the product is obtained continuously, at a remarkably higher production rate which involves reducing the dehydration time to, for example, a little over one hour.

The new process consists in spreading on the inner surface of a cylindrical container or sublimator under vacuum a thin layer of the material in the form of a fluid film, the cylindrical container providing an ambient under vacuum, in a thickness of less than one millimeter, preferably of about 3/10 of a millimeter; in subjecting this film to a pre-heating from the outside, to a temperature of +15° C., while at the inside maintaining the temperature of the frozen film under —20° C.; and then in subjecting the film to a short heating, also from the inside, along a generant, so as to ensure the sublimation of the frozen product without melting it, and finally in scraping off the resultant dried layer which falls down in the form of a powder.

This process is realized in its three stages in a single cycle rotation of a revolving apparatus mounted inside a cylindrical chamber; said apparatus comprises three implements, radially distributed at a suitable distance from one another, so that one implement spreads the substance in a thin film over the inside wall of the cylinder, the temperature and pressure conditions whereof are such as to cause the immediate freezing of said film; the next implement comprises a heater, extending along a cylinder generant, capable of establishing during its passage a quick heating from the inside, causing the sublimation without melting of the thin layer; and the third implement is constituted by a scraper, which also operates along a generant and which separates from the inside surface the dried layer, letting it fall downwards, and cleans the surface of the cylindrical chamber so as to make it ready to receive the next spreading of liquid, effected by means of the first implement.

An apparatus for carrying out this process is illustrated in the appended drawing, which is intended as an example of the invention and not to limit the invention, wherein:

FIGURE 1 shows a longitudinal vertical section of a complete apparatus;

FIGURE 2 illustrates at a larger scale the inner rotor with the heating implement in the front;

FIGURE 3 shows, also at an enlarged scale, the inner rotor with the implement for applying the layer of the substance to be lyophilized;

FIGURE 4 is a transverse section, along the line IV—IV in FIGURE 2; and

FIGURE 5 is a partial longitudinal section, along the line V—V in FIGURE 3.

The equipment consists of a vacuum tight container 1, wherein there is introduced continuously the liquid to be lyophilized. Through the control valve VL said liquid reaches the feeder 2, feeder 2 being connected with the vapour phase of the container 1 through the valve V. At the bottom of the feeder 2 there is a spherical joint 3, connecting same with the rotor 5, which is provided with a driving pulley 4 or another equivalent linked by belt 26 with motor 25 member.

The rotor 5 extends in the sublimating chamber 6 which is surrounded by a water jacket 7. The lower conical portion 22 of the chamber 6 is closed by a two-way deviating cock 8 which communicates with the separators 9, each having incorporated a 23 and provided with a condensed water valved outlet conduit 26 condenser, to which is secured the collecting container 10 for the lyophilized product.

The components forming the rotor are: the hollow shaft 14, beginning in the male part of the spherical joint 3 and serving as feed pipe for the liquid; the electric lead 15, extending from the feeder 2 to the brush 12, and being coaxial with the hollow shaft 14; the feed pipe 16 for the liquid, terminating in the chamber 21 defined by the gasket 17, the brush 11, which is a square section body urged against the cylindrical wall 6' of the chamber 6 by a leaf spring 18 (FIG. 5).

A vacuum is drawn on the system by means of centrifugal vacuum pump 24, which communicates with each separator 9, and hence with the system, by means of a valved conduit 27.

The brush 12 is a cylindrical body revolving about pivots and supports pushed by a leaf spring 18, and containing a heating element 20.

The scraping blade 13 is constituted by a bent plate (FIG. 4) also urged outwardly by a leaf spring 18.

The brushes 11 and 12, and the scraping blade 13 are each supported and protected rearwardly by a rigid support having a U-shaped section, and designated respectively by 19, 19' and 19''.

The scraping blade 13 might also be brought to a somewhat high temperature (such as about 80° C.) in order to improve the drying of the product.

The most suitable material for manufacturing the apparatus is stainless steel, but it is understood that any other material unattackable by the substances to be treated in the apparatus could be used without departing from the scope of the invention.

The operation of the apparatus takes place as follows: the liquid to be lyophilized is introduced in the vessel 1 where it undergoes a preliminary degasification with a consequent cooling down to +4° C. The quantity of liquid flowing through the automatic control valve VL is set according to the evaporating surface of the chamber 6 and the amount of calories it is possible to supply.

Pressure and temperature are measured at the feeder 2 and act through electric controls on the setting of the two valves VL and V.

The liquid flowing from the feeder 2 into the chamber 21, defined by the gasket 17, therefore has a temperature and pressure constantly controlled and steady, wherein there is taken account of the leakage through the gasket 17 and the influence of the wall 6', with its water jacket at 15° C.

The liquid, freely flowing in a rivulet that does not fill entirely the section of the feed pipe 16 (FIG. 3), wets the wall 6' and comes out of the zone defined by the gasket 17 in the form of a thin layer or film, adhering to the wall.

Being suddenly exposed to a much lower pressure, the liquid film evaporates and freezes instantaneously, and then continues to sublimate, due to the pressure gradient between the vapour pressure of the frozen film and the total pressure inside of the chamber 6.

The next passage of the heating brush 12 accelerates this sublimation, making it total and immediate.

The solid residue adhering to the wall is then scraped off by the brush 12 and allowed to fall by gravity and be carried together with the water vapour towards the lower cone 22 and, through the large section cock 8, to be introduced into one of the cyclone separators 9, where the vapours condense in the refrigerating coil. The lyophilized powder is collected in a container 10.

Since the refrigerating coil 23 of the separator 9 gets covered with ice or other frozen liquid, there are provided two symmetrical separators 9 for alternate in order that a separator may be shut down for removal of the ice or other frozen liquid operation.

In case the discharge of the vapour be effected by means of an ejector, the deviating cock 8, the two condensers 9, and one of the cyclone separators would be eliminated.

The succession of the three operations described above, that take place in the cylindrical chamber, namely, the spreading or distribution of the substance on the inside wall of said chamber, the heating of the deposited film and its scraping off, can be effected not only in an apparatus having the shape as described and shown, but also in an apparatus constituted by a metallic band conveyor whereon glide one after the other said implements, at predetermined intervals and in an ambient at a pressure and temperature similar to those disclosed for the embodiment described above.

It is to be understood that in this variant of embodiment, the metal band conveyor moves, while the three implements remain stationary, thus realizing an operation equivalent to that of the first form of embodiment although mechanically different.

For the realization both of the first and of the second variant, the physical conditions given hereunder in the way of an illustrating but not limiting example, may be as follows: In the pre-chamber 21 the pressure is 10 mm. of Hg; the total pressure in the sublimator 6 is of 0.3 mm. of Hg; the temperature of the outer water jacket is +15° C.; the temperature of the subliming film inside the chamber is −25° C. The thermal differential of 40° C. between the outside face and the inside face of the wall 6' allows the use of the thermal contents of spring water, thus saving in the heat energy required to be supplied by heating brush 12. The maximum temperature of the heating brush 12 is +120° C., and the scraping brush temperature is +80° C.; the powdered material in the collecting container has a temperature of about +60° C. while the condenser temperature is −40° C. The gliding speed of the implements relative to the surface whereon the film of the material to be lyophilized is deposited is about 6 meters per minute and depends upon the type of material to be lyophilized.

What is claimed is:

1. Process for continuously lyophilizing foodstuffs in order to preserve them comprising continuously spreading on a section of a continuous surface, in an ambient under vacuum, a thin film of a thickness less than one millimeter of the material to be lyophilized in liquid state, freezing said film, then subjecting one face of said film to a pre-heating at a temperature of about 15° C., while maintaining the temperature at the other face of said film below about −20° C., then subjecting said film to a brief heating to sublimate the frozen film without melting it, and scraping the resultant dried film off the surface whereby a lyophilized powder is obtained.

2. A process according to claim 1, wherein the liquid state material is spread at a pressure higher at the moment of spreading than at the moment of sublimation, said different pressures being ensured by keeping the liquid out of contact with the solid formed as a result of the sublimation.

3. Apparatus for continuously lyophilizing foodstuffs in order to preserve them, comprising means defining a process zone, said means having an internal surface, gastight sealing means dividing said process zone into a pre-chamber and a chamber, conduit means for feeding in liquid form the foodstuffs to be lyophilized to said pre-chamber so that said liquid runs down said surface, spreading means abutting against said surface for spreading said liquid into a thin film, heating means disposed in said chamber in juxtaposition to said surface for heating a frozen film on said surface, and scraper means abutting against said surface for scraping solidified residue from said surface.

4. Apparatus according to claim 3, wherein said surface is movable and said means dividing the process zone comprises a gasket abutting against said surface.

5. Apparatus according to claim 4, wherein said surface is the outer face of a cylindrical member, an arcuate member is disposed radially of the cylindrical member to define a wall of the pre-chamber and the gasket is disposed in sealing relationship between said cylindrical member and said arcuate member to seal said pre-chamber from said chamber, said pre-chamber constituting that portion of the work zone within the inner periphery of the gasket and said chamber constituting that part of the work zone beyond the outer periphery of the gasket, and conduit means communicating with said pre-chamber for feeding the foodstuffs in liquid form to said pre-chamber, said spreading means, said heating means and said scraping means are mounted in radially spaced relationship relative to the axis of said cylinder, means for providing relative rotational motion between said member and said cylinder so that liquid fed to the pre-chamber is spread as a thin film on said surface by said spreading means for freezing and then the frozen film comes into juxtaposition with said heater for sublimation and then the resultant residue comes into contact with said scraper.

References Cited by the Examiner

UNITED STATES PATENTS

| | | | |
|---|---|---|---|
| 1,970,956 | 8/1934 | Elser | 34—5 |
| 2,306,265 | 12/1942 | Heald | 34—92 |
| 2,388,917 | 11/1945 | Hormel | 34—5 |
| 2,621,492 | 12/1952 | Beardsley et al. | 34—5 |
| 2,751,687 | 6/1956 | Colton | 34—5 |
| 2,818,656 | 1/1958 | Holleman | 34—5 |
| 2,853,797 | 9/1958 | Graham et al. | 34—5 |
| 2,885,788 | 5/1959 | Leviton | 34—5 |

WILLIAM J. WYE, *Primary Examiner.*

NORMAN YUDKOFF, *Examiner.*